(12) United States Patent
Hansson

(10) Patent No.: US 6,785,591 B1
(45) Date of Patent: Aug. 31, 2004

(54) METHOD FOR DETERMINING OPTIMUM SCREW JOINT TIGHTENING PARAMETER VALUES BY PROCESS SIMULATION

(75) Inventor: Gunnar Christer Hansson, Stockholm (SE)

(73) Assignee: Atlas Copco Tools AB, Nacka (SE)

( * ) Notice: Subject to any disclaimer, the term of this patent is extended or adjusted under 35 U.S.C. 154(b) by 747 days.

(21) Appl. No.: 09/597,335

(22) Filed: Jun. 19, 2000

(30) Foreign Application Priority Data

Jun. 22, 1999 (SE) .............................................. 9902371

(51) Int. Cl.[7] ........................ G05B 13/00; G05B 15/00; G05B 21/00; G06B 7/48; B23Q 5/00
(52) U.S. Cl. ............................ 700/275; 703/7; 173/176
(58) Field of Search ........................ 700/28–30, 32–34, 700/52, 275, 304; 702/33, 41, 96, 105; 703/7; 173/176, 178, 179, 181; 73/862.21, 862.22, 862.23, 761; 81/467; 29/407.02, 240, 240.5

(56) References Cited

U.S. PATENT DOCUMENTS

| 4,316,512 A | * 2/1982 | Kibblewhite et al. ........ 173/183 |
| 5,154,242 A | * 10/1992 | Soshin et al. ................ 173/178 |
| 5,284,217 A | * 2/1994 | Eshghy ........................ 173/176 |
| 5,315,501 A | * 5/1994 | Whitehouse ................. 700/32 |
| 5,631,823 A | * 5/1997 | Layer et al. .................. 700/50 |
| 5,637,968 A | * 6/1997 | Kainec et al. ............... 318/432 |
| 5,650,574 A | * 7/1997 | Sato et al. ............... 73/862.23 |
| 6,161,629 A | * 12/2000 | Hohmann et al. .......... 173/181 |

OTHER PUBLICATIONS

Seneviratne, Lakmal. "On the Use of Mechatronics for Intelligent Screw Insertions." IEEE, Feb. 1996, pp. 193–198.*

* cited by examiner

Primary Examiner—Leo Picard
Assistant Examiner—R Jarrett
(74) Attorney, Agent, or Firm—Frishauf, Holtz, Goodman & Chick, P.C.

(57) ABSTRACT

A method is provided for determining the optimum control parameter values for a screw joint tightening process carried out by a power wrench which is controlled by a programmable control system utilizing the determined parameter values. The control system is provided with screw joint tightening characteristic parameter values and operation parameter values characteristic of the actually used power wrench. The tightening process is mathematically simulated by using the screw joint and power wrench characteristic parameter values as well as pre-chosen operation control parameter values. And the result of the simulated tightening process is evaluated in view of predetermined evaluation criteria, thereby determining the suitable operation control parameter values to be used during production tightening of the actual type of screw joint.

4 Claims, 2 Drawing Sheets

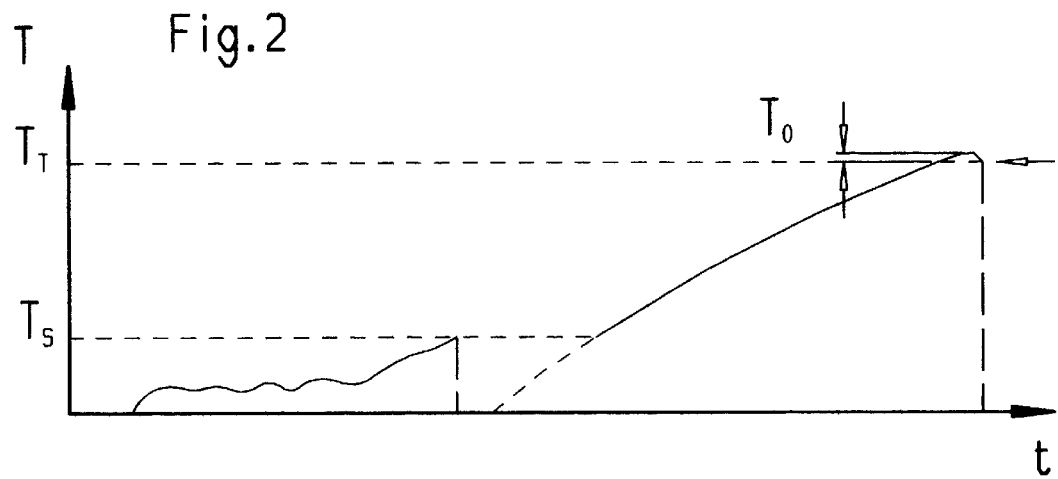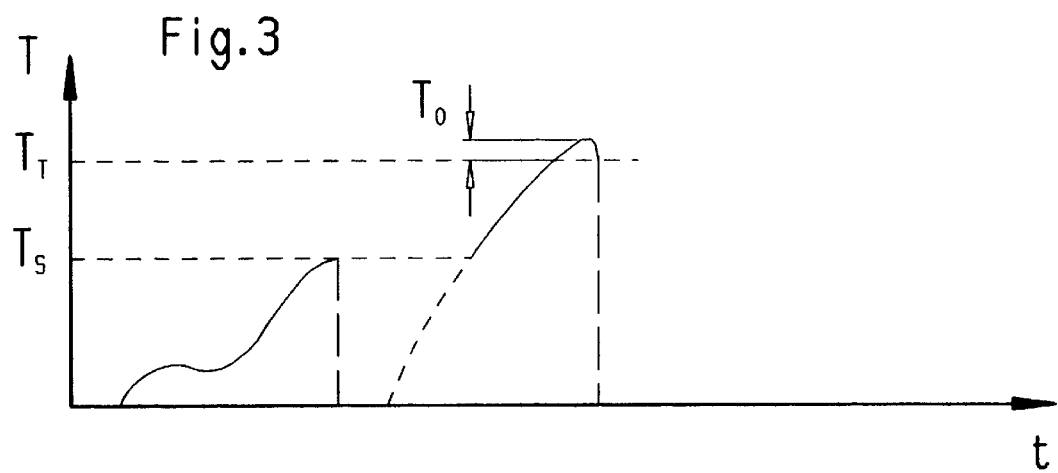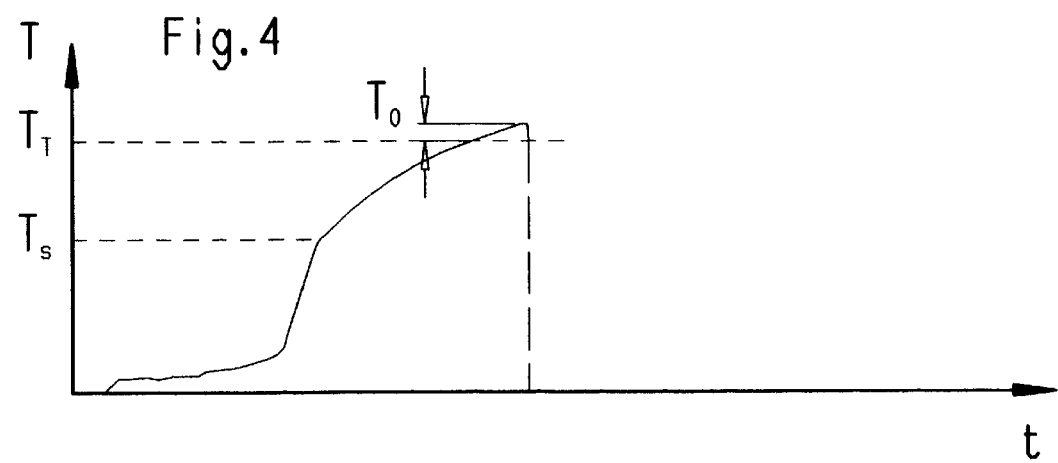

METHOD FOR DETERMINING OPTIMUM SCREW JOINT TIGHTENING PARAMETER VALUES BY PROCESS SIMULATION

FIELD OF THE INVENTION

The invention relates to a method for determining the optimum operation control parameter values for a screw joint tightening process carried out by means of a power wrench controlled by a programmable control system in accordance with such determined optimum operation control parameter values.

BACKGROUND OF THE INVENTION

Power wrenches controlled by programmable control systems are usually used in production work, assembly line operations in particular, where the accessibility of the power wrench and production efficiency have high priority. Programming of the control system and determining the optimum power wrench operation characteristics usually takes some time. The method usually practised today means that parameter values believed to be suitable for the intended tightening process are programmed into the control system, and a number of tightening operations are performed. The results are evaluated, the parameter values are adjusted, and another series of tightening operations is performed. In order not to lose too much time, this is usually done during the regular assembly work, mostly by slowing down or stopping the assembly line.

However, this type of iterating process to find the most favourable operation control parameter values is not only time consuming per se, but often results in readjustments and in some cases even replacement of damaged screw joints tightened during the programming procedure. The probability to find the optimum tightening parameter values by the very first more or less randomly chosen values is very small, which means that a number of "test" tightenings have to be performed.

Alternatively, the power wrench could be lifted out of production for programming and test tightening. However, this means a highly undesirable reduction of the power wrench accessibility and production efficiency.

SUMMARY OF THE INVENTION

In order to speed up the programming procedure and substantially avoid readjustments of the screw joints tightened during the programming procedure, the invention provides a method for calculation of the optimum operation control parameter values for obtaining a tightening process having desired characteristics, including an acceptable tightening target accuracy. The method comprises a mathematical simulation of the tightening, including the use of parameter values characteristic for the actual type of screw joint as well as operation parameter values characteristic for the power wrench actually being used.

Further objects and advantages of the method according to the invention will appear from the following specification.

The invention is described below in further detail with reference to the accompanying drawings.

BRIEF DESCRIPTION OF THE DRAWINGS

FIGS. 2 and 3 show diagrams illustrating two two-step tightening processes with different programmings.

FIG. 4 shows a diagram illustrating a one-step tightening process.

DETAILED DESCRIPTION

Figure 1:
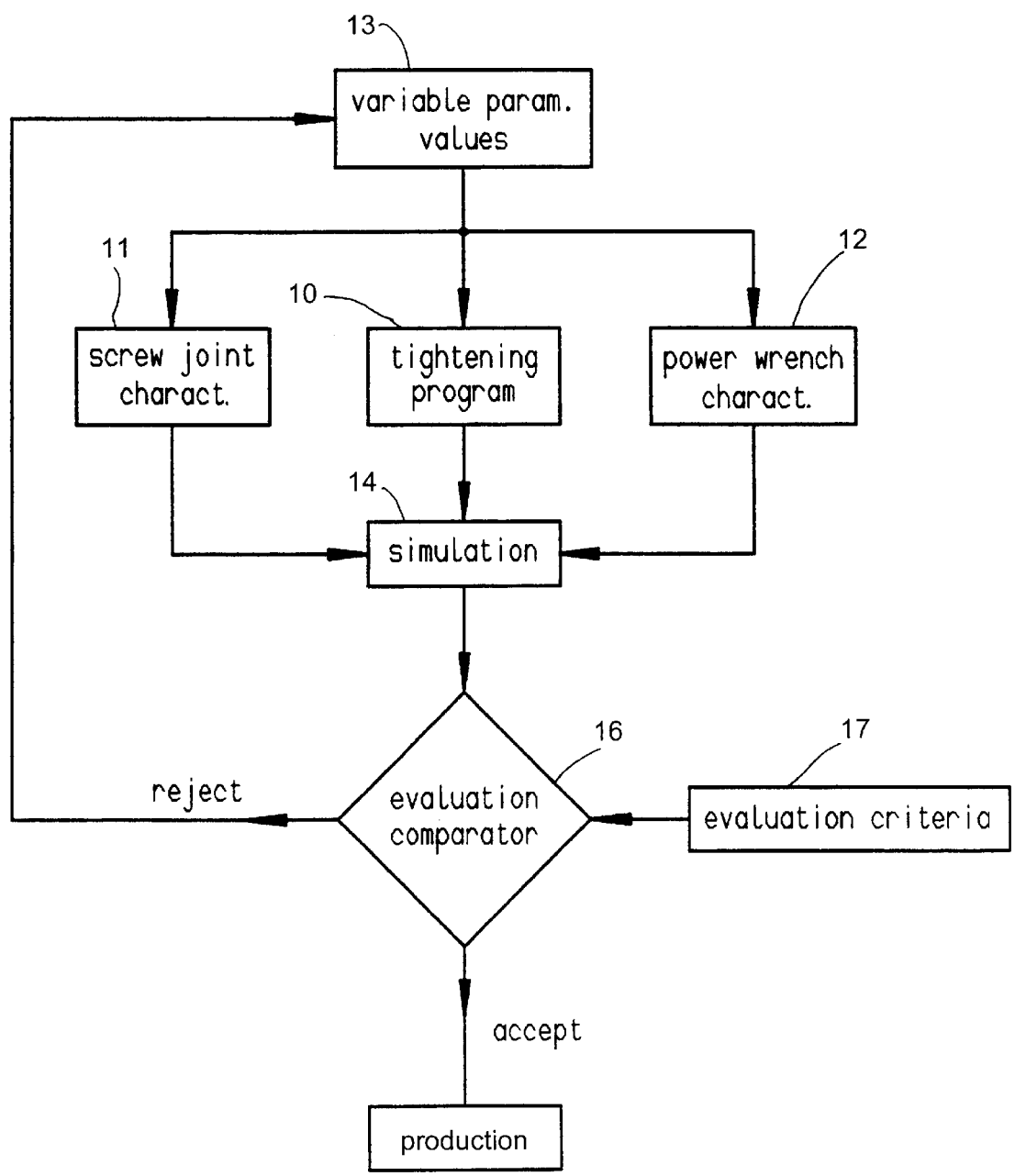
FIG. 1 shows a flow chart illustrating the method according to the invention.

The method according to the invention is suitably carried out by means of an electric power wrench which is connected to a control system having a drive means for supplying a suitable drive voltage to the power wrench. The voltage output of this drive means should have a variable frequency and voltage magnitude for varying the speed and torque output of the power wrench. The control system should also comprise a programmable data processing and storage means. A control system suitable for this purpose is marketed by Atlas Copco Tools AB under the name: POWER FOCUS 2000.

The method according to the invention is illustrated in the flow chart in FIG. 1, wherein a program unit 10 is supplied with parameter values characteristic for the screw joint to be tightened and stored in a data base 11, operation parameter values characteristic for the power wrench being used and stored in a data base 12, as well as operation control parameter values chosen from a great number of values stored in a data base 13.

In the simulation step, the tightening process is performed mathematically in a data processing unit 14 on the basis of the screw joint and power wrench characteristic parameter values provided from the data bases 11 and 12, as well as on the basis of operation control parameter values provided from the data base 13. The method for determining the optimum tightening process control parameter values is carried out in that such control parameter values which are estimated to give an acceptable result of the tightening process are pre-chosen from the data base 13 and used for a first simulation.

The result of the simulation is evaluated by a comparator 16 in which data representing desired criteria values chosen for the actual tightening process and stored in a memory 17 are compared with the simulation result. Such evaluation criteria may be: the tightening accuracy as regards the tightening target value, tightening process duration, ergonomically favourable reaction forces etc.

If the result of the first simulation is accepted in view of the desired evaluation criteria values, the pre-chosen process control parameter values are kept in the memory of the control unit and used for production tightening.

If, on the other hand, the result of this first simulation is rejected the simulation process is restarted with changed control parameter values chosen from the data base 13. Such a restart of the simulation procedure will be repeated one or more times with successively changed control parameter values until the simulated tightening result is accepted. Then, the last used control parameter values are kept in the control system memory and used for production tightening.

As described above, the method according to the invention means that a number of operation parameter values are optimised via a mathematical procedure wherein the tightening process to be performed on a certain type of screw joint is simulated using basic parameter values that are characteristic for the actual screw joint and parameter values characteristic for the power wrench actually being used. The most important parameter related to the screw joint is the so called joint rate, i.e. the growth in axial load in relation to screw joint rotation. Important characteristic parameters related to the power wrench and its drive means are torque and speed capacities as well as dynamic characteristics like acceleration and retardation abilities, including the motor and drive train inertia.

As mentioned above, the main objectives of the method according to the invention are to obtain a fast and safe programming of the control unit and to optimise the tightening process in respect to process duration, tightening target accuracy and ergonomy. The optimum operation data have to be related to the priority given to these three aspects. If tightening target accuracy is given the highest priority, the tightening speed, at least during the final stage, has to be low enough not to let the inertia of the rotating power wrench parts cause any undesirable torque overshoot. The speed could be successively reduced towards the end of the process according to a predetermined deceleration ramp.

If the process duration is given the highest priority, the power wrench speed has to be increased which might result in a somewhat reduced tightening target accuracy.

Ergonomic aspects on the tightening process may affect the process time in so far that an adaptation of the reaction torque characteristics to the operator's ability to counteract the reaction torque may require a somewhat slower process. However, an extended tightening process may likewise be straining to the operator. An optimum of duration and magnitude of the reaction torque is to be found to provide an ergonomically favourable process.

The method according to the invention may also comprise a sensitivity analysis wherein some parameters are changed at repeated tightening simulations to see how much these parameters may vary in relation to other parameters without causing the tightening process result fall outside the predetermined evaluation criteria values.

In order to illustrate how the tightening process may be changed by varying some of the tightening parameters, there are illustrated three different ways of tightening a screw joint to a predetermined target torque level $T_T$.

In FIG. 2, there is illustrated a two-step process in which the screw joint is first rotated at a relatively low speed up to a speed shift level $T_S$. At this point the power wrench is stopped for a short interval and then restarted and rotated at a relatively low speed up to the target torque level $T_T$. Since the target torque level is reached at a relatively low speed, the torque overshoot $T_O$ is very small. In other words, the final tightening accuracy is high. The process time, though, is rather long.

In FIG. 3, there is also illustrated a two-step tightening process wherein the screw joint is first tightened up to a speed shift level $T_S$ where the power wrench is stopped. After a short intermission, the second step is commenced. Compared to the process illustrated in FIG. 2, this process is performed at a higher speed. This means that the speed shift level $T_S$ is reached much quicker. Also the second step is performed at a higher speed, which means that the target torque level $T_T$ is reached much quicker as well.

However, the relatively high rotation speed during the second step and the subsequent high kinetic energy of the rotating parts of the power wrench means that the target torque level $T_T$ is passed to a higher degree than in the previously described example. The torque overshoot $T_O$ may become high enough not to be accepted under the accuracy requirements. If, however, the torque overshoot is acceptable there is obtained a much less time consuming tightening process.

Another way of changing the process in order to comply with set-up conditions is to choose a one-step process as illustrated in FIG. 4. Like the process illustrated in FIG. 3, this process is performed at a relatively high speed. This means that the speed shift level $T_S$ is reached quickly. At the speed shift level $T_S$, however, the rotation is not interrupted just the speed is down shifted so as to approach the target torque level $T_T$ at a speed low enough not to cause any unacceptable torque overshoot $T_O$. Since the intermission at the speed shift level $T_S$ is omitted, this one-step process is still shorter than the process illustrated in FIG. 3.

Apart from altering the power wrench rotation speed and determining whether the tightening should be performed in one or two steps, there are other parameters to consider when optimising the process. For instance, there may be used any suitable speed reduction ramp at the end of the process in order to avoid or at least reduce the torque overshoot $T_O$.

What is claimed is:

1. A method for determining optimum operation control parameter values for a screw joint tightening process carried out by a power wrench which is controlled by a control system that includes a programmable computer and that utilizes said optimum operation control parameter values, said method comprising:
   a) storing in said control system basic parameter values characteristic of a screw joint to be tightened as well as operation parameter values characteristic of the power wrench being used,
   b) providing said control system with pre-chosen operation control parameter values estimated to enable the screw joint tightening process to achieve an acceptable result,
   c) simulating mathematically the screw joint tightening process using said pre-chosen operation control parameter values as well as said parameter values characteristic of the screw joint to be tightened and said operation parameter values characteristic of the power wrench being used,
   d) evaluating a result of said simulated tightening process in view of predetermined evaluation criteria to thereby one of: I) accept the result of said simulated tightening process and maintain said pre-chosen control parameter values for use as production tightening parameter values, and II) reject the result of said simulated tightening process, and restart said tightening process simulation at least one time, each time using changed pre-chosen operation control parameter values until the result of said simulated tightening process is accepted, and maintain said changed pre-chosen operation control parameter values in said control system for use as production tightening parameter values.

2. The method according to claim 1, wherein control data are communicated between the power wrench control system and the computer for said tightening process simulation.

3. The method according to claim 1, wherein said computer is separate from said control system.

4. The method according to claim 2, wherein said computer is separate from said control system.

* * * * *